Feb. 25, 1930.                C. CARRIGER                1,748,635
                              TRAILER BRAKE
                          Filed June 20, 1927         3 Sheets-Sheet 1
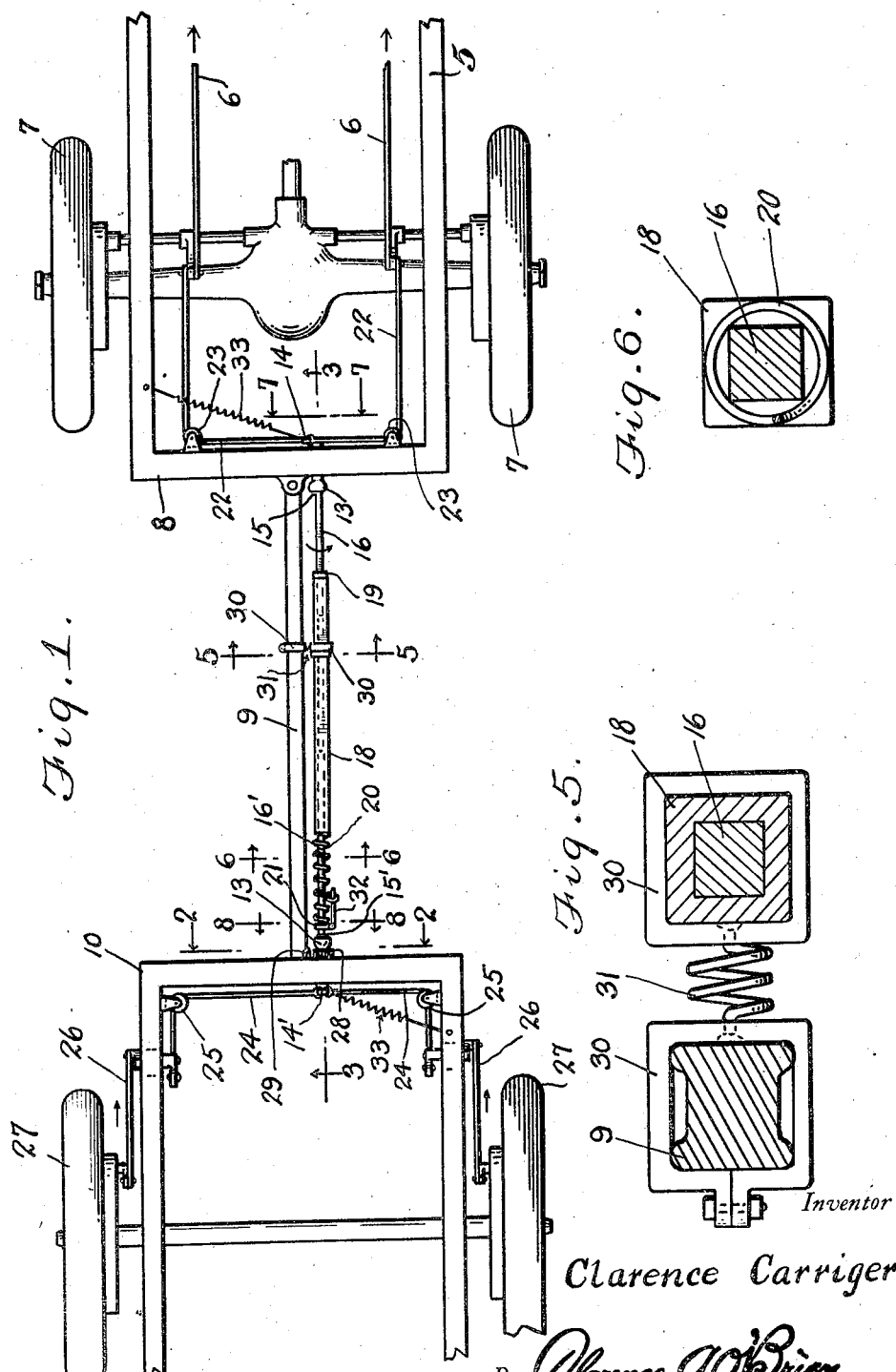
Inventor
Clarence Carriger
By Clarence A O'Brien
                Attorney Feb. 25, 1930.  C. CARRIGER  1,748,635
TRAILER BRAKE
Filed June 20, 1927    3 Sheets-Sheet 2
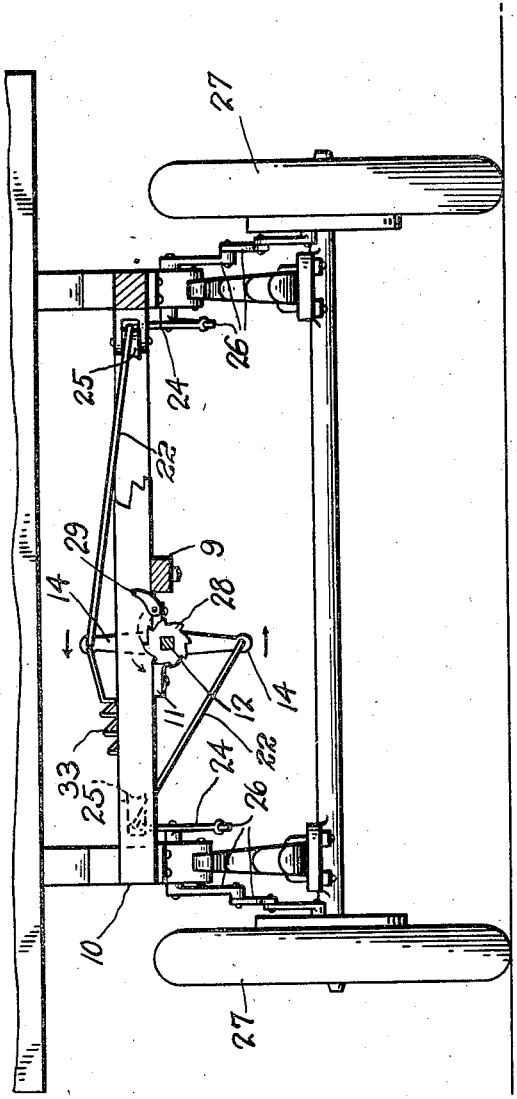
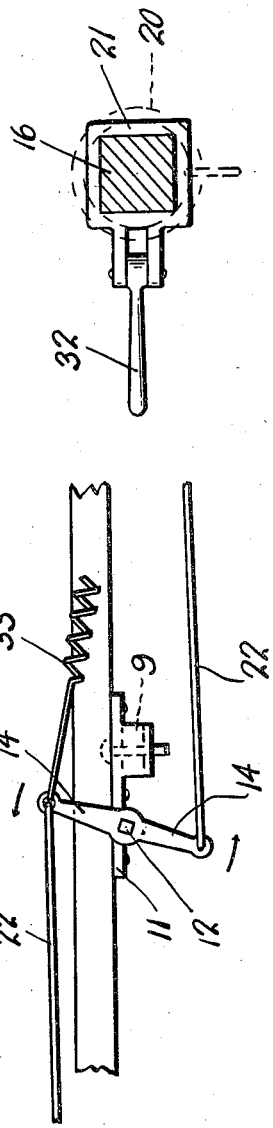
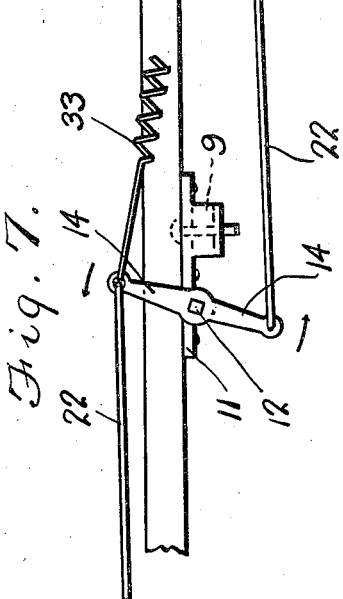
Inventor
Clarence Carriger
By Clarence A. O'Brien
Attorney

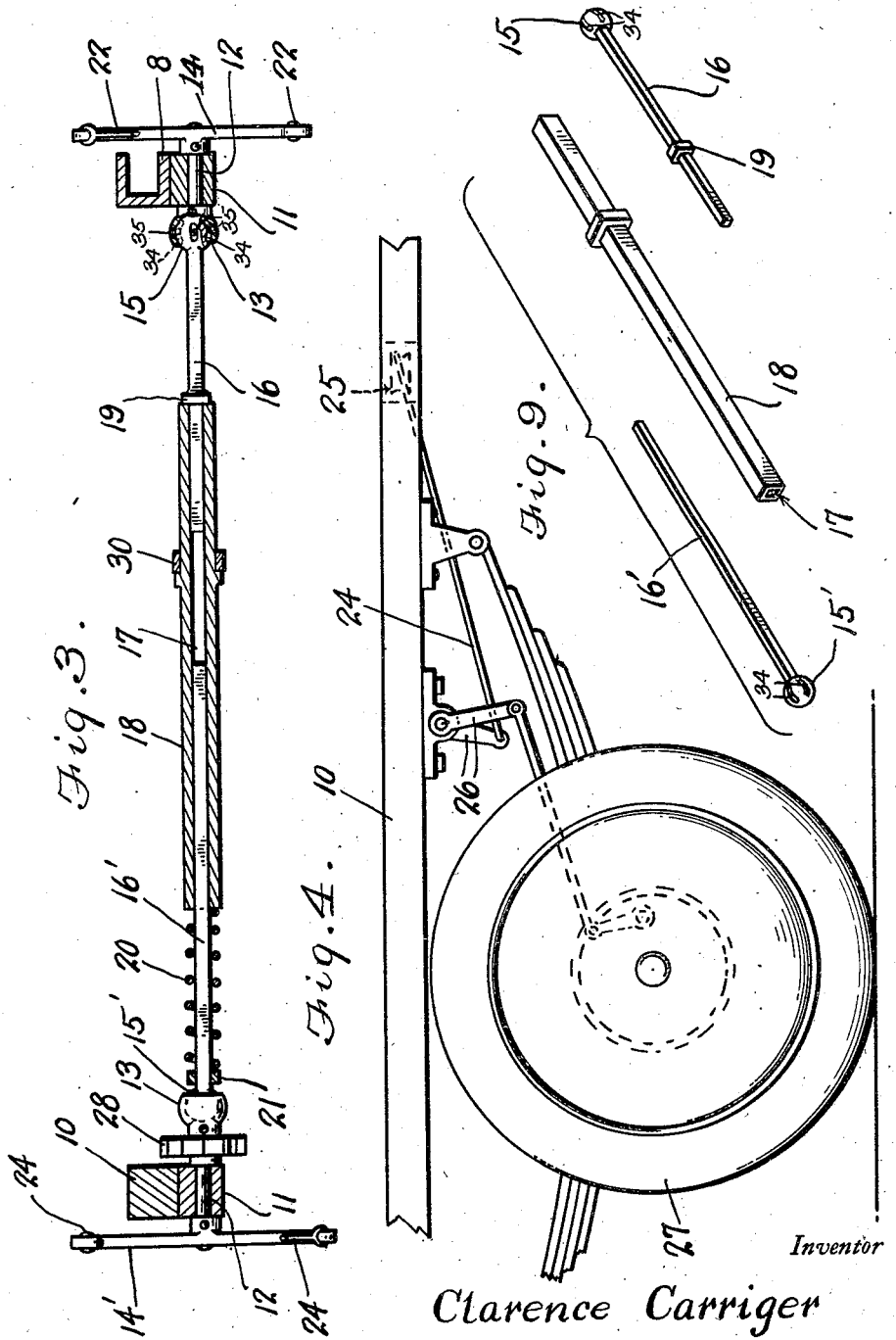

Patented Feb. 25, 1930

1,748,635

UNITED STATES PATENT OFFICE

CLARENCE CARRIGER, OF ENID, OKLAHOMA

TRAILER BRAKE

Application filed June 20, 1927. Serial No. 200,082.

My invention relates to brake operating mechanism for the wheels of a trailer vehicle and has for an object to operatively connect the brakes of the trailer with the brake mechanism of the pulling vehicle and arranged for simultaneous operation therewith.

Another object of the invention is to provide means for locking the trailer brake mechanism when the same has been disconnected from the pulling vehicle.

A further object is to provide a yieldably connecting means between the brake mechanisms of the various vehicles permitting longitudinal movement of the connecting means whereby to facilitate the free coupling and uncoupling of the trailer and at the same time maintaining a rigid rotary connection between the brake mechanism coupler for the positive operation of the brake.

Other objects and advantages reside in the special construction, combination and arrangement of the various elements forming the invention as more fully hereinafter described and claimed, reference being had to the accompanying drawings forming part hereof, wherein:

Figure 1 is a plan view of the connected ends of a vehicle with the trailer shown connected in operative relation therewith, Figure 2 is a transverse sectional view taken along the line 2—2 of Figure 1, Figure 3 is a longitudinal sectional view through the brake coupling taken along a line 3—3 of Figure 1, Figure 4 is an elevational view showing the trailer brake rods, Figure 5 is a transverse sectional view taken along a line 5—5 of Figure 1, Figure 6 is a similar view taken along a line 6—6 of Figure 1 with the draw bar removed, Figure 7 is an elevational view of one of the brake rod operating levers arranged at each end of the rotatable vehicle brake coupling, Figure 8 is a transverse sectional view taken along a line 8—8 of Figure 1, also with the draw bar removed and Figure 9 is a group perspective of the telescoping brake coupling rod.

Referring now to the drawings I have disclosed my invention comprising a brake mechanism for vehicle trailers adapted for use in connection with a pulling vehicle indicated at 5 which is provided with the usual brake rods 6 extending longitudinally of the frame of the vehicle and operatively connected with the wheels 7 thereof. To the rear transverse frame member 8 is adapted to be attached a draw bar 9 extending forwardly from the front transverse frame member 10 of a trailer. To each of the transverse frame members 8 and 10 is secured a clamp 11 having a bore extending therethrough for rotatably carrying a shaft 12 extending longitudinally with respect to the vehicle and having its ends extending outwardly from the vehicle provided with a socket member 13 with the opposite ends of said shaft provided with a substantially vertically disposed lever 14 which is connected to the shaft intermediate its ends.

The respective socket members 13 are adapted to receive balls 15 and 15' swivelly disposed within said members, said ball 15 being formed on one end of a rod 16, square-shaped in cross section, with the opposite end of the rod 16 adapted to be slidably received in the forward end of a similarly shaped bore 17 formed within a hollow connecting rod 18. The rod 16 is provided with a collar 19 adapted to abut the forward end of the hollow rod 18 whereby to limit the inward movement of said rod. The ball 15', is formed on a centrally constructed rod 16' which extends forwardly of the trailer with its forward end slidable in the rear end of the connecting rod 18. Upon the rod 16' is arranged a coil spring 20 having its rear edge abutting a collar 21 formed on the rod 16' and its forward end engaging the rear end of the rod 18, said spring being arranged to normally maintain the rod 16' in an outwardly extending position.

To the opposite ends of the lever 14 arranged on the pulling vehicle is attached the ends of cables 22 extending about pulleys 23 and connected with the brake rods 6 extending longitudinally at opposite sides of the vehicle whereby the operation of said rods through the brake pedal of the car will cause the ends of the lever 14 to turn in a direction as indicated by the arrows shown in Figure 1 of the drawings. Likewise, the lever 14' arranged at the front end of the trailer is connected by similar cables 24 extending to opposite sides of the trailer through pulleys 25 and connected by suitable links 26 with the brakes of the trailer wheels 27. It is apparent that the movement transmitted to the lever 14 carried by the forward vehicle will be transmitted through the rods 16 and 18 in a same manner to the lever 14 carried by the trailer. Thus the operation of the brake rod 6 will likewise result in the operation of the brakes of the trailer. In order to secure the ball and socket connections for rotary movement as a unit and at the same time permit vertical and horizontal swivel movement therebetween, each ball is formed with a series of grooves 34, extending longitudinally thereof for receiving around its pins 35 carried by the associated socket members as shown in Figure 3.

After the brakes have been applied the trailer may be disconnected from the pulling vehicle and the brakes retained in engaged position by means of a ratchet 28 interposed on the shaft 12 between the socket member 13 and the forward end of the trailer and adapted to be engaged by a pawl 29 carried by the trailer frame 10. When the trailer has been disconnected the brake coupling rod 18 may be retained in parallel relation with respect to the draw bar 9 by means of a pair of clamps 30 arranged on said rod and draw bar and yieldably connected by a coil spring 31 extending between the clamps. In this manner the parts are retained in their associated position for the quick coupling of the trailer.

Whenever it is desired to release the brakes of the trailer after the same has been disconnected a lever 32 connected with the collar 21 carried on the rearwardly disposed rod 16 may be operated to slightly rotate said rod so as to release the pawl 29 from engagement with the ratchet thereby releasing the tension of the brake. A coil spring 33 may be attached at one end to the trailer frame with its opposite end connected with the lever 14 for the purpose of maintaining the cables 24 in a taut condition.

In the present disclosure of the invention I have shown my trailer brake operating mechanism adapted for use in connection with a pulling vehicle but it is apparent that the same is readily adapted for use in the operation of the brake of one or more trailer vehicles arranged in a train, each of the trailers being adapted to be operated in a like manner from the vehicle immediately preceding the same.

It is obvious that the invention is susceptible to various changes and modifications without departing from the spirit thereof or the scope of the appended claims and I accordingly claim all such forms of the device to which I am entitled.

I claim:

1. In combination a pair of vehicles, a vehicle draw bar attachable at its ends to the respective vehicles, brake mechanism for the vehicles and a connector for the brake mechanism of the respective vehicles comprising a telescopic coupling rod, means at each end for attaching to the respective brake mechanisms for simultaneous operation of the brakes and supporting means between the draw-bar and the coupling rod for retaining the same in substantially parallel relation when either or both are uncoupled.

2. In combination, a pair of vehicles, a vehicle draw bar attachable at its ends to the respective vehicles, brake mechanisms for the vehicles, shafts rotatably carried by the vehicles, rods swivelly connected at one end to the respective shafts, a tubular rod telescopically connecting the opposite ends of the shafts for uniform rotation, angular extensions carried by the shafts, brake attaching means for said extensions connecting the same to the brakes of the respective vehicles, and yieldable means connecting the draw bar and the tubular rod for retaining the same in substantially parallel relation when either or both are uncoupled and providing for the relative rotary movement of said tubular rod.

3. In combination, a pair of vehicles, a draw bar attachable at its ends to the respective vehicles, brake mechanisms, shafts rotatably carried by the vehicles having sockets at one end, levers at the opposite ends of the shafts and disposed angularly thereto, a pair of rods having balls at one end for swivelly mounting in said sockets and connected thereto for uniform rotary movement, a hollow rod telescopically connecting the other ends of the rods, spring means carried by one of the swivelly mounted rods normally urging the same outwardly of the telescoping rod, a pawl and ratchet for securing one of the rods against brake releasing movement, a lever operatively associated with said rod for manually releasing the pawl, means connecting the first named levers with the respective brakes, a draw-bar forming a rigid connection between the vehicles, a pair of collars carried by the draw bar and the hollow rod and spring means connecting said collars providing for the relative rotary movement of the hollow rod during the operation of the brakes and operable to retain the draw-bar and rod in substantially parallel relation upon the uncoupling of either the draw-bar or the rod.

In testimony whereof I affix my signature.

CLARENCE CARRIGER.